US010027792B1

(12) United States Patent
Sweeney

(10) Patent No.: US 10,027,792 B1
(45) Date of Patent: Jul. 17, 2018

(54) SYSTEMS AND METHODS FOR NOTIFYING USERS OF EMERGENCY IMPACT ZONES

(71) Applicant: Robert J. Sweeney, Kansas City, MO (US)

(72) Inventor: Robert J. Sweeney, Kansas City, MO (US)

(*) Notice: Subject to any disclaimer, the term of this patent is extended or adjusted under 35 U.S.C. 154(b) by 0 days.

(21) Appl. No.: 15/620,425

(22) Filed: Jun. 12, 2017

(51) Int. Cl.
| H04M 11/04 | (2006.01) |
| H04M 1/725 | (2006.01) |
| H04W 4/02 | (2018.01) |
| H04W 4/22 | (2009.01) |
| H04W 4/90 | (2018.01) |

(52) U.S. Cl.
CPC ... *H04M 1/72541* (2013.01); *H04M 1/72552* (2013.01); *H04M 1/72572* (2013.01); *H04W 4/023* (2013.01); *H04W 4/22* (2013.01); *H04W 4/90* (2018.02)

(58) Field of Classification Search
USPC ............... 455/404.2, 3.01; 379/45; 707/722; 348/143; 340/539.13
See application file for complete search history.

(56) References Cited

U.S. PATENT DOCUMENTS

| 8,787,871 | B2* | 7/2014 | Givens | G06Q 10/04 455/404.2 |
| 8,947,225 | B2 | 2/2015 | Best | |
| 9,060,248 | B1* | 6/2015 | Coulombe | H04W 4/021 |
| 9,542,597 | B2 | 1/2017 | Chung et al. | |
| 2011/0115623 | A1 | 5/2011 | Gnanasekaran et al. | |
| 2012/0064855 | A1* | 3/2012 | Mendelson | G01C 21/206 455/404.2 |
| 2012/0190295 | A1* | 7/2012 | Kim | G06Q 10/06 455/3.01 |
| 2012/0295576 | A1* | 11/2012 | Peterson | G08G 1/205 455/404.2 |
| 2015/0098553 | A1* | 4/2015 | Bonitati | H04M 3/5116 379/45 |
| 2015/0100567 | A1* | 4/2015 | Weir | G06F 17/30424 707/722 |
| 2015/0111524 | A1 | 4/2015 | South | |
| 2015/0163626 | A1 | 6/2015 | Zimmer | |
| 2015/0201316 | A1* | 7/2015 | Khatibi | H04W 4/02 455/404.2 |
| 2015/0312527 | A1* | 10/2015 | Ansiaux | H04N 7/181 348/143 |
| 2016/0210858 | A1* | 7/2016 | Foster | G08G 1/0965 |
| 2017/0171754 | A1* | 6/2017 | South | H04W 12/06 |
| 2017/0236403 | A1* | 8/2017 | Yang | G08B 25/10 340/539.13 |

* cited by examiner

*Primary Examiner* — David Q Nguyen
(74) *Attorney, Agent, or Firm* — Armstrong Teasdale LLP

(57) ABSTRACT

An emergency notification (EN) computing device includes at least one processor and a memory in communication with the processor. The processor is programmed to receive, from a user device, an emergency report that identifies an emergency situation and is associated with a report location, receive user input defining an impact zone within a geographical region based on the report location and the emergency situation, collect location data from a plurality of mobile user devices associated with a plurality of bystanders, detect a first bystander located within the impact zone based on the location data, and automatically notify the first bystander of the emergency situation.

21 Claims, 10 Drawing Sheets

US 10,027,792 B1

SYSTEMS AND METHODS FOR NOTIFYING USERS OF EMERGENCY IMPACT ZONES

BACKGROUND

The field of the disclosure relates generally to notification systems for reporting potential emergencies, and more specifically, systems for notifying users located within an impact of an emergency reported by other users.

Emergency situations are situations that may cause potential harm to people, animals, property, and/or the environment. Emergency situations include natural emergencies, such as landslides, fires, and storms, as well as man-made emergencies, such as chemical leaks, chemical fires, damaged buildings, reported criminals, and the like. Emergency responders (e.g., law enforcement, fire fighters, medical responders, etc.) are trained to prevent or otherwise contain the emergency situation to limit damage and prevent injuries to bystanders. Generally, emergency responders guide bystanders away from the emergency situation to protect the bystanders from potential harm.

In some cases, people near an emergency situation may not even realize the emergency is occurring immediately. For example, a bystander downwind from an airborne chemical leak may be unaware of the leak until the bystander sees or smells the leak, which may be too late for the bystander to avoid harm. Bystanders located in areas that the emergency responders have difficulty accessing (e.g., wooded areas or streets with dense traffic) and bystanders located near emergency situations that develop quickly are particularly prone to being unaware of nearby emergency situations. Moreover, even if the bystander determines an emergency situation is nearby, the bystander may be unable to determine the location of the emergency, and thus may accidentally run towards the emergency rather than away from it.

BRIEF DESCRIPTION

In one aspect, an emergency notification (EN) computing device includes at least one processor and a memory in communication with the processor. The processor is programmed to receive, from a user device, an emergency report that identifies an emergency situation and is associated with a report location, receive user input defining an impact zone within a geographical region based on the report location and the emergency situation, collect location data from a plurality of mobile user devices associated with a plurality of bystanders, detect a first bystander located within the impact zone based on the location data, and automatically notify the first bystander of the emergency situation.

In another aspect, a method for notifying bystanders of an emergency situation is provided. The method is at least partially performed by an EN computing device. The method includes receiving, from a user device, an emergency report that identifies an emergency situation and is associated with a report location, receiving user input defining an impact zone within a geographical region based on the report location and the emergency situation, collecting location data from a plurality of mobile user devices associated with a plurality of bystanders, detecting a first bystander located within the impact zone based on the location data, and automatically notifying the first bystander of the emergency situation.

In yet another aspect, at least one non-transitory computer-readable storage media having computer-executable instructions embodied thereon is provided. When executed by at least one processor, the computer-executable instructions cause the processor to receive, from a user device, an emergency report that identifies an emergency situation and is associated with a report location, receive user input defining an impact zone within a geographical region based on the report location and the emergency situation, collect location data from a plurality of mobile user devices associated with a plurality of bystanders, detect a first bystander located within the impact zone based on the location data, and automatically notify the first bystander of the emergency situation.

DETAILED DESCRIPTION

Figure 1:
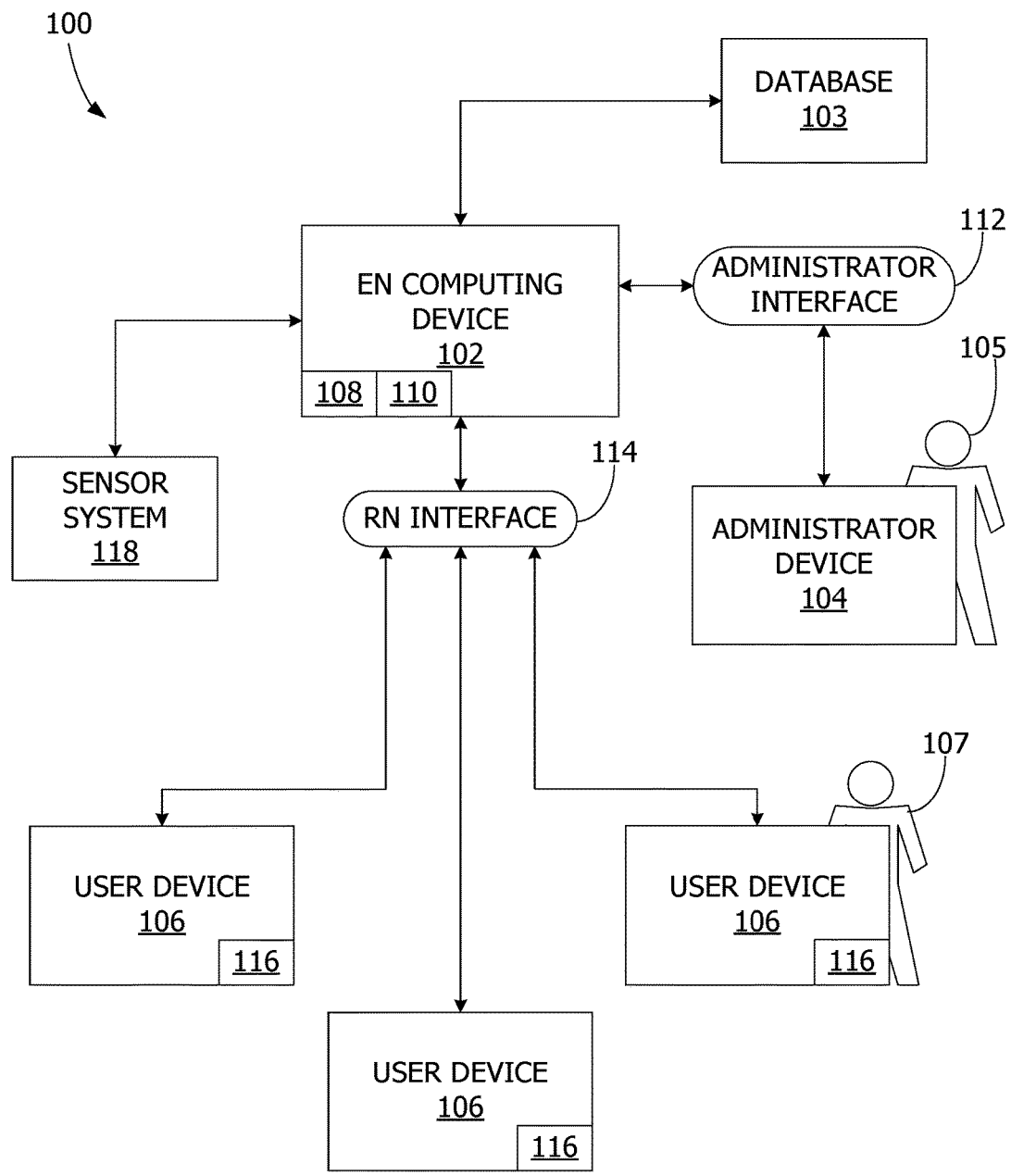
FIG. 1 is a block diagram of an emergency notification (EN) computing system for notifying bystanders of emergency situations.

The systems and methods described herein are associated with notification systems for reporting potential emergencies, and more specifically, systems notifying users located within an impact of an emergency reported by other users.

An emergency notification (EN) system and methods associated with the EN system are described herein. The EN system is configured to facilitate reporting emergency situations and notifying bystanders that are located in an area that may be potentially affected by the emergency situation. The EN system includes an EN computing device communicatively coupled to a plurality of user computing devices (e.g., smartphones, tablets, etc.). The user computing devices are associated with a plurality of bystanders. As used herein, a bystander refers to any person located relatively near an emergency situation that may be affected by the situation, including general populace, people associated with an emergency situation, and emergency responders. The EN computing device is configured to enable a bystander to submit an emergency report for a potential emergency situation using his or her user computing device. In one example, a bystander reports a fire using an EN application associated with the EN computing device installed on his or her user computing device. The emergency report includes, for example, a description of the emergency situation, an image or video captured by the bystander, and a location of the bystander and/or the emergency situation. In some embodiments, location data of the bystander is collected separately and the EN computing device is configured to associate a last known location of the bystander with the emergency report.

The EN computing device is configured to receive the emergency report and extract each data element from the report for storage. The EN computing device includes an interface for displaying the data from the emergency report to an administrator (e.g., an emergency responder). The interface may be a display of the EN computing device or a web interface accessible by the administrator via a user computing device. In the exemplary embodiment, the interface displays a geographical region and emergency reports having locations within the geographical region. The EN computing device is configured to enable the administrator to access the emergency reports and determine whether or not to initiate an EN process for the emergency situation. The EN process defines an area that may be affected by an emergency situation and notifies bystanders located within and/or near the defined area of the emergency situation. The notified bystanders may then evacuate the area or perform other actions in response to the emergency situation.

In at least some embodiments, the administrator provides user input to the interface defining an impact zone associated with the emergency situation. In some examples, the impact zone includes a location of the emergency situation as reported by the bystanders. In other examples, the impact zone does not include the reported location of the situation, such as for emergencies that are mobile (e.g., airborne chemicals). The impact zone is then displayed on the interface. In the exemplary embodiment, the EN computing device collects location data from the bystanders in the geographical region to detect any bystanders located in or near the impact zone. In some embodiments in which the user computing devices of the bystanders include an EN application, the EN application is configured to collect location data (e.g., Global Positioning System (GPS) data) from the user computing device and cause the user computing device to transmit the location data to the EN computing device. The location data is collected synchronously (i.e., periodically) and/or asynchronously.

The EN computing device is configured to track the location of each bystander within the geographical region and display the locations through the interface. The locations are updated over time using the location data to monitor movements of the bystanders. When a bystander is detected to be near or within the impact zone, the EN computing device is configured to automatically notify the bystander of the emergency situation. In some embodiments, the notification is provided via the user computing device of the bystander, such as a text message, a notification from the EN application, an email, and the like. In at least some embodiments, the notification includes information regarding the estimated location of the emergency situation, what type of emergency has occurred, and/or other information that the bystander can use to decide a subsequent course of action, such as where to evacuate. While the impact zone is active (i.e., notifications are sent to bystanders for entering the impact zone), emergency responders or other entities may be responding the emergency situation to resolve the situation. After a predetermined period of time or in response to input from the administrator indicating the emergency situation has been resolved, the impact zone is deactivated or removed.

The technical problems addressed by this system include at least one of: (i) inability to track and notify bystanders of nearby emergency situations; (ii) increased burden on emergency responders to detect, notify, and evacuate bystanders away from an emergency; (iii) reliance on trained professionals and sensors to report emergency situations; and (iv) inability to monitor multiple emergency reports for various emergency situations together.

The technical solution provided by the systems and methods described herein include at least one of: (i) automatic tracking and notification of bystanders for emergency situations; (ii) reduced burden on emergency responders to detect, notify, and evacuate bystanders by proactively notifying the bystanders of the emergency; (iii) increased awareness of potential emergencies by providing bystanders the ability to report potential emergencies; and (iv) unified interface for an administrator to track multiple emergency reports and assess emergencies within a geographical region.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application in industrial, commercial, and academic applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a block diagram of an exemplary EN system 100 for reporting emergencies and notifying bystanders of nearby emergencies. System 100 includes an EN computing device 102, an administrator device 104, and a plurality of user computing devices 106. In other embodiments, system 100 may include additional, fewer, or alternative subsystems, including those described elsewhere herein. For example, system 100 may include additional or fewer user computing devices 106.

EN computing device 102 includes at least one processor 108 and a memory 110 in communication with processor 108. Memory 110 is configured to store computer-readable instructions that, when executed by processor 108, cause EN computing device 102 to function as described herein. Although EN computing device 102 is referred to herein as a single computing device, it is understood that EN computing device 102 may include a plurality of computing devices. For example, EN computing device 102 may be a distributed computing system including a plurality of computing devices that operate together to perform the functions of EN computing device 102. In another example, EN computing device 102 includes a plurality of computing devices that operate separately from each other such that each EN computing device 102 performs the functions of EN computing device 102 separately.

In the exemplary embodiment, EN computing device 102 is communicatively coupled to a database 103. Database 103 is configured to store various information associated with system 100 and EN computing device 102, such as, and without limitation, user profiles, previously received reports, and defined impact zones as described herein. EN computing device 102 is configured to store data in database 103 and retrieve the stored data for subsequent use. In some embodiments, database 103 is communicatively coupled to other computing devices (e.g., administrator device 104) in addition to EN computing device 102 to receive and store data. In certain embodiments, database 103 is integrated with EN computing device 102.

In the exemplary embodiment, EN computing device 102 includes an administrator interface 112. Administrator interface 112 is configured to provide information to an administrator 105 and receive user input for administrator 105 for EN computing device 102. Administrator 105 is a person that manages operation of EN system 100 through accessing and controlling EN computing device 102. In one example, administrator 105 is an emergency responder that monitors EN system 100 to assist emergency response in a geographical region. In some embodiments, a plurality of administrators 105 may have access to EN system 100.

In the exemplary embodiment, administrator interface 112 is an interface accessible by administrator device 104. Administrator device 104 is a computing device associated with administrator 105. Administrator device 104 and interface 112 enable administrator 105 to remotely access EN computing device 102 and/or enable multiple administrators to access EN computing device 102 at the same time. In one example, EN computing device 102 is a host computing device (e.g., a server) that provides a web interface 112 for administrator device 104 to access. Alternatively, administrator 105 may access EN computing device 102 without administrator device 104. For example, if administrator interface 112 includes a display and/or a input interface (e.g., a touchscreen, a mouse, a keyboard, etc.), administrator can physically interact with interface 112 to access EN computing device 102.

In the exemplary embodiment, EN computing device 102 is communicatively coupled to user computing devices 106 to receive reports on potential emergency situations and to notify users near the emergency situations. At least some of user computing devices 106 are associated with bystanders, such as bystander 107. The bystanders include, but are not limited to, general populace, users associated with an emergency situation, and emergency responders. Users associated with an emergency situation include, for example, workers at a work site that has experienced an emergency (e.g., a chemical spill) and users the report an emergency situation. In certain embodiments, some user computing devices 106 are not associated with a particular bystander, such as one user computing device 106 that monitors an area, a work site, a work plant, and the like for emergency situations. At least some user computing devices 106 are mobile devices that are carried or worn by the bystanders, such as, and without limitation, smartphones, wearable electronics, tablets, laptops, GPS devices, and/or other smart devices.

EN computing device 102 is configured to communicate with user computing devices 106 via a report and notification (RN) interface 114. RN interface 114 enables user computing devices 106 to provide emergency reports to EN computing device 102 using structured data elements according to a predetermined format as described herein. Emergency reports indicate a type of emergency being reported, video and/or image data of the emergency, and a location of the emergency or the bystander reporting the emergency. In addition, RN interface 114 enables EN computing device 102 to transmit notifications to user computing devices 102 based on emergencies reported by user computing devices 106.

In some embodiments, RN interface 114 is a web interface accessible by user computing devices 106. In the exemplary embodiment, RN interface 114 is accessible via an EN application 116 installed on user computing devices 106. EN application 116 is configured to provide RN interface to the bystanders at user computing devices 106 and to cause user computing devices 106 to automatically provide certain information or data to EN computing device 102. In particular, application 116 causes user computing devices 106 to automatically provide location data associated with user computing devices 106 to EN computing device 102. The location data is collected by application 116 synchronously (e.g., application 116 periodically requests the location data from user computing device) and/or asynchronously, such as when application 116 has permission from user computing device 106 to retrieve the location data or when another application installed on user computing device 106 retrieves the location data. The location data is used as described herein to facilitate reporting emergency situations in a geographical region and notifying bystanders of nearby emergency situations.

In certain embodiments, system 100 further includes one or more sensor systems 118 communicatively coupled to EN computing device 102. Sensor systems 118 are configured to collect sensor data associated with one or more locations that may be prone to and/or are vulnerable to emergency situations. For example, a storage tank storing chemicals may include a sensor system 118 to monitor the tank for any leaks. In another example, a sensor system 118 is positioned near a riverfront to monitor for flooding during rainfall. In the exemplary embodiment, sensor systems 118 provide the sensor data to EN computing device 102 for analysis. In other embodiments, another computing device (e.g., user computing device 106) receives the sensor data, analyzes the sensor data, and provides an emergency report to EN computing device 102 based on the analysis. In some embodiments, system 100 does not include sensor systems 118.

In the exemplary embodiment, EN computing device 102 is configured to perform an emergency reporting process and an emergency notification process. During the emergency reporting process, EN computing device 102 is configured to collect emergency reports from user computing devices 106 (in addition to sensor data from sensor systems 118) and display the emergency reports to administrator 105 via administrator interface 112. The emergency reports are accessed and reviewed by administrator 105 to determine whether or not to initiate the emergency notification process for an emergency situation reported by one or more bystanders. Administrator 105 may also review other information to facilitate his or her determination, such as information provided by emergency responders.

When administrator 105 determines bystanders should be notified of the emergency situation, the emergency notification process is initiated. During the emergency notification process, administrator 105 provides user input to administrator interface 112 to define an impact zone. The impact zone is a geographical region that may potentially be affected by the emergency situation. Location data is collected from user computing devices 106 by EN computing device 102 to determine a location of each bystander relative to the impact zone. When EN computing device 102 detects a bystander located within or near the impact zone, EN computing device 102 automatically generates a notification to be sent to user computing device 106 associated with the bystander. The notification indicates that the bystander is near an emergency. In at least some embodiments, the notification provides additional information, such as a location of the emergency, the distance between the bystander and the emergency, and the type of emergency. Based on the notification, the bystander may determine a course of action, such as evacuating his or her current location to avoid the emergency situation. EN computing device 102 continues to detect bystanders within the impact zone and notify the detected bystanders until the impact zone is deactivated.

Figure 2:
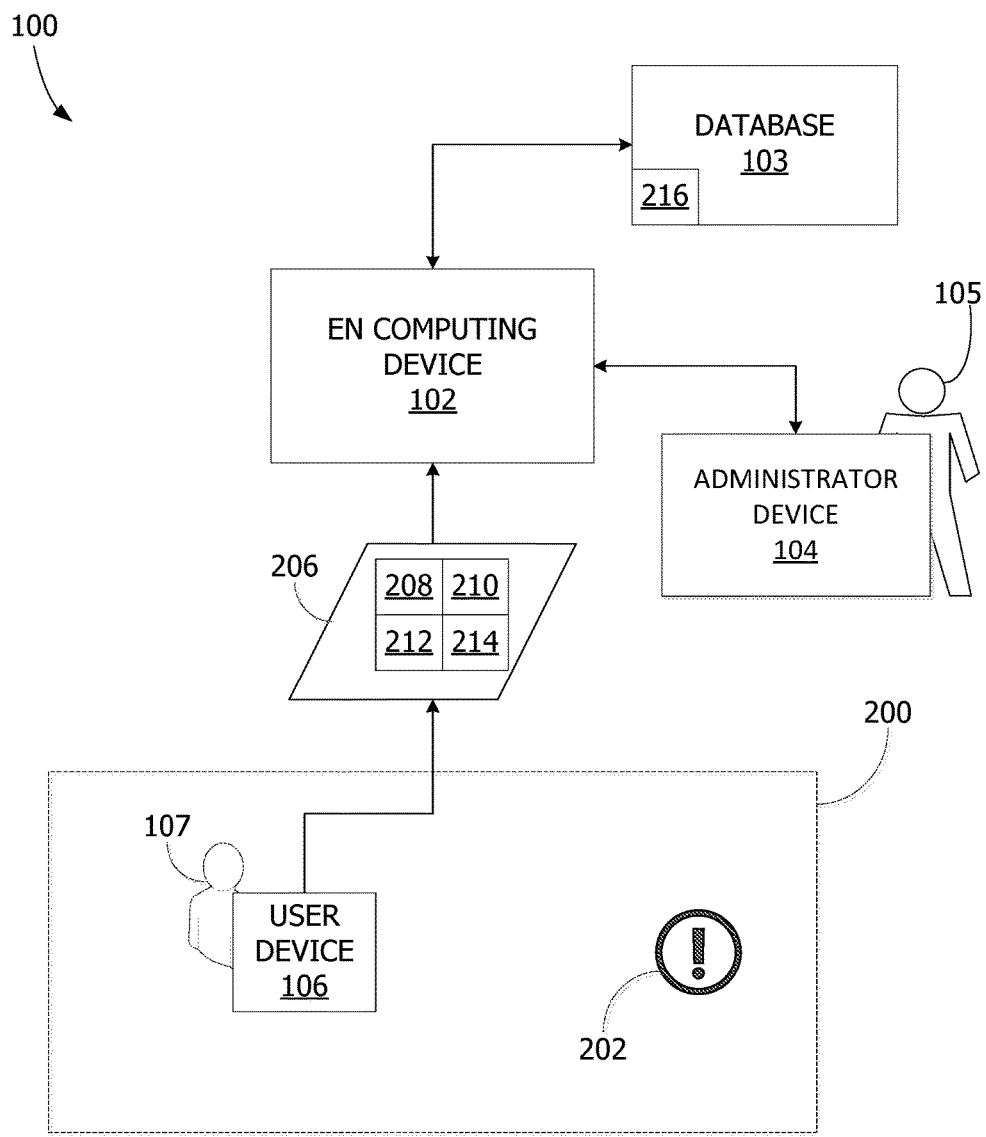
FIG. 2 is a data flow diagram of an exemplary emergency report process of the system shown in FIG. 1.

FIG. 2 is a data flow diagram of system 100 (shown in FIG. 1) during an exemplary emergency report process. In other embodiments, the emergency report process includes additional, fewer, or alternative data, including those described elsewhere herein.

In the exemplary embodiment, bystander 107 is located within a geographical region 200 monitored by EN computing device 102. Region 200 is a predefined geographical area and may be any suitable size and/or shape. In one example, region 200 is a zip code. In another example, region 200 is defined by city or neighborhood boundaries. In yet another example, region 200 is defined within boundaries provided by administrator 105.

Bystander 107 observes or identifies a potential emergency situation 202 within geographical region 200. Emergency situation 202 may be, for example, a natural emergency (e.g., fire) or an emergency involving people, such as a fight or a suspicious person entering private property. Emergency situation 202 either has occurred, is ongoing, or may subsequently occur. Bystander 107 then reports situation 202 to EN computing device 102 via user device 106.

In the exemplary embodiment, user device 106 executes EN application 116 (shown in FIG. 1) to report situation 202. More specifically, EN application 116 prompts bystander 107 for information associated with situation 202 for transmittal to EN computing device. In one example, bystander 107 writes a description and captures image data of situation 202. User device 106 is configured to generate an emergency report 206 based on the data collected by user device 106. In the exemplary embodiment, report 206 includes description data 208, image/video data 210, location data 212, and user data 214. Description data 208 provides a description of situation 202, such as the type of emergency being reported. Image/video data 210 is image and/or video data associated with situation 202 captured by user device 106. Location data 212 indicates a location of bystander 107 and/or an estimated location of emergency situation 202. In one example, location data 212 is collected using location services provided by user device 106 (e.g., a GPS module of user device 106). In some embodiments, location data 212 is transmitted separately from report 206 as described herein. In such embodiments, EN computing device 102 identifies the last known or received location data 212 from user device 106 to associate with report 206. User data 214 identifies bystander 107 and associated bystander 107 with report 206. User data 214 may be used to contact bystander 107 after report 206 is submitted and/or to identify a user profile 216 associated with bystander 107 that is stored in database 103 as described herein. In some embodiments, user data 214 may be anonymous (i.e., bystander 107 is not identifiable from user data 214). In other embodiments, report 206 includes additional, fewer, or alternative data, including data described elsewhere herein.

The data elements of emergency report 206 are collected by user device 106 by prompting user input from bystander 107 and/or collected data from sensors, modules, and other components of user device 106. User device 106 is configured to format the data elements into a predetermined data structure for emergency reports 206. Report 206 is then transmitted to EN computing device 102 for storage and processing.

EN computing device 102 is configured to receive emergency report 206 and store report 206 in database 103. In at least some embodiments, EN computing device 102 is configured to analyze report 206 and extract the data elements (i.e., description data 208, image data 210, location data 212, and user data 214) for storage. Emergency report 206 is provided to administrator 105 for review via EN computing device 102 and administrator device 104. Based on the review of report 206, administrator 105 decides a subsequent course of action. For example, administrator 105 may dispatch emergency responders to resolve emergency situation 202. In another example, administrator 105 causes EN computing device 102 to initiate an emergency notification process as described herein. EN computing device 102 is configured to provide a plurality of reports 206 to administrator 105 to enable administrator 105 to address each report 206 using a single, unified interface.

In at least some embodiments, EN computing device 102 assigns a status indicator to each received report 206 to facilitate tracking reports 206, the course of action taken for each report, and any resolution of the corresponding emergency situations 202. In one example, the status indicator for each report is one of a "received" status indicating report 206 has been received but not reviewed, an "ongoing" status for reports 206 in which administrator has determined and initiated an course of action, a "resolved" status for reports 206 associated with resolved situations 202, and a "non-emergency" status for reports 206 associated with situations 202 that are determined to be non-emergencies. In other embodiments, additional, fewer, or alternative status indicators are assigned to reports 206. EN computing device 102 is configured to enable administrator 105 to assign and change the status indicators for each report 206. In certain embodiments, EN computing device 102 is configured to monitor stored reports 206 for received or ongoing reports 206 that have not changed status after a predetermined period of time. EN computing device 102 alerts administrator 105 of these reports 206 to facilitate resolution of time-sensitive emergencies.

In some embodiments, database 103 stores user profiles 216. User profiles 216 are associated with bystanders (e.g., bystander 107) and include information associated with the bystanders. In one example, user profile 216 is associated with bystander 107 and includes contact information for bystander 107, a current location of bystander 107, and reports 206 submitted by bystander 107. EN computing device 102 is configured to retrieve user profile 216 to facilitate functions described herein. In one example, when report 206 is received, EN computing device 102 retrieves a corresponding user profile 216 for administrator 105 to review with report 206.

Figure 3:
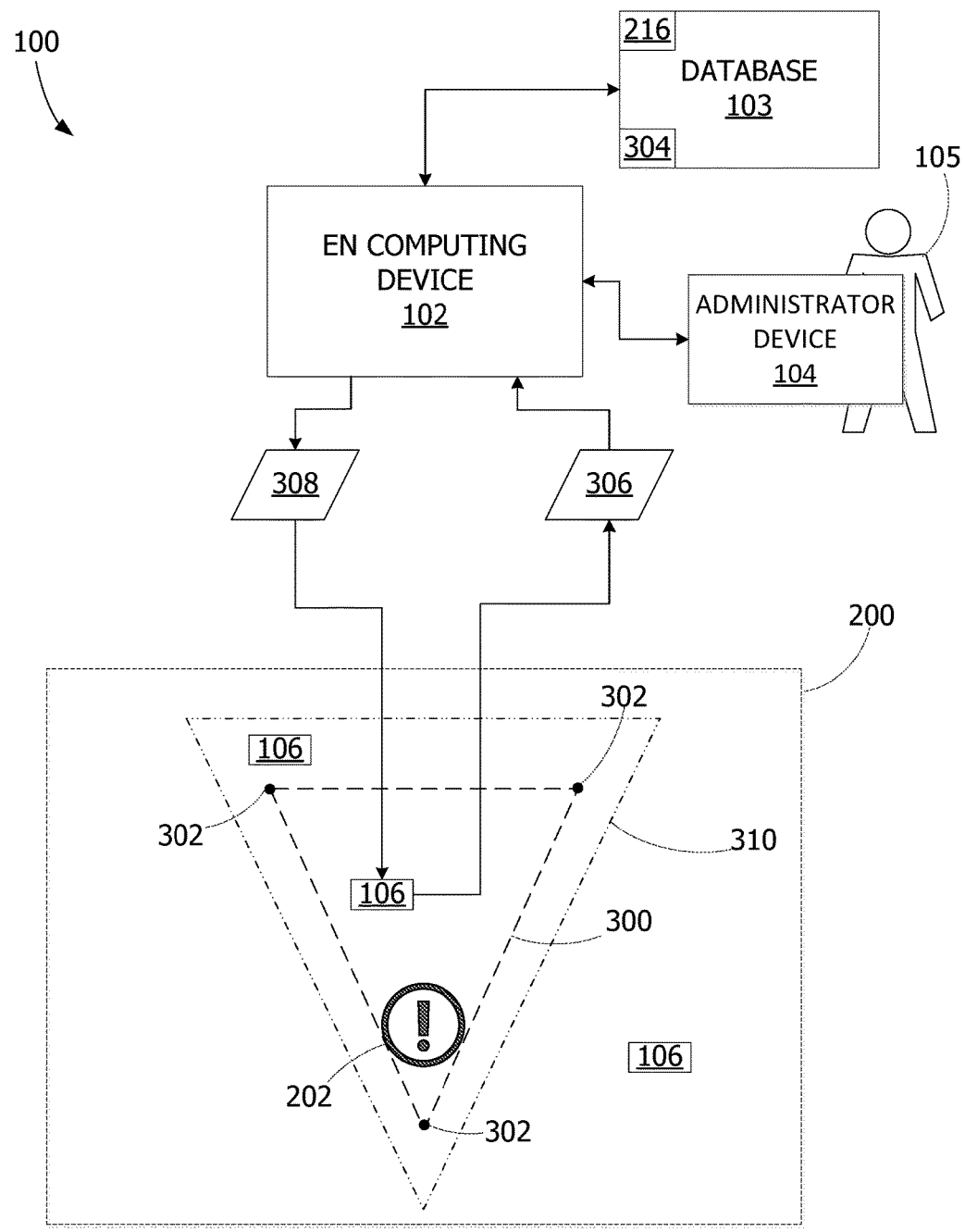
FIG. 3 is a data flow diagram of an exemplary emergency notification process of the system shown in FIG. 1.

FIG. 3 is a data flow diagram of system 100 (shown in FIG. 1) during an exemplary emergency notification process. In one example, the emergency notification process is initiated in response to the emergency report process described above. In other embodiments, the emergency notification process includes additional, fewer, or alternative data, including data described elsewhere herein.

In the exemplary embodiment, administrator 105 initiates the emergency notification process in response to emergency situation 202 and one or more corresponding reports 206 received during the emergency report process. Administrator 105 provides user input to EN computing device 102 via administrator interface 112 (shown in FIG. 1) to define an impact zone 300 associated with situation 202. Impact zone 300 is a geographical area that may be affected by emergency situation 202. In the illustrated example, emergency situation 202 is an airborne chemical leak. In the example, impact zone 300 includes an area proximate to the origin of the chemical leak as well as an area located downwind from situation 202.

EN computing device 102 is configured to define impact zone 300 based upon one or more coordinate points 302. Impact zone 300 has any suitable size and/or shape based upon situation 202. Zone 300 is at least partially located within region 200. In the exemplary embodiment, impact zone 300 has a triangular shape defined by three coordinate points 302 within geographical region 200. Coordinate points 302 are geographical coordinates used by EN computing device 102 when generating boundaries for zone 300. In the illustrated example, coordinate points 302 are corners of a triangular boundary. In another example, two or more coordinate points 302 define a diameter of impact zone 300. In yet another example, coordinate point 302 is an origin or center of impact zone 300 (e.g., a circular zone 300). In at least some embodiments, administrator 105 provides coordinate points 302 to EN computing device 102. In other embodiments, EN computing device 102 automatically determines coordinate points 302. EN computing device 102 is configured to perform any suitable boundary definition methods to define impact zone as described herein. Alternatively, EN computing device 102 does not use coordinate points 302 to define zone 300. Rather, in some embodiments, EN computing device 102 receives user input from administrator 105 manually defining boundaries of zone 300 (i.e., administrator draws the boundaries).

EN computing device 102 generates zone data 304 to define impact zone 300. Zone data 304 identifies coordinate points 302, boundaries of zone 300, an area within zone 300, and/or other information associated with impact zone 300. In at least some embodiments, zone data 304 indicates a type of emergency or description of emergency situation 202 associated with zone 300. In certain embodiments, zone data 304 includes one or more identifiers that identify any associated emergency reports 206 (shown in FIG. 2).

In the exemplary embodiment, EN computing device 102 is configured to notify bystanders of emergency situation 202 via their respective user devices. More specifically, EN computing device 102 determines current locations of the bystanders using user devices 106 and compares the current locations to impact zone 300. Bystanders determined to be within impact zone 300 are notified of situation 202 to enable the bystanders to react accordingly to situation 202.

In the exemplary embodiment, location data 306 is collected from user devices 106 by EN computing device 102 to determine a current location of each bystander within region 200. In one example, location data 306 is GPS data. In certain embodiments, user devices 106 include a location module (not shown) that determines a location of user device 106 (and the bystander). Location data 306 is sent synchronously (i.e., periodically) and/or asynchronously. In the exemplary embodiment, location data 306 is transmitted to EN computing device 102 irrespective of impact zone 300 being defined. That is, location data 306 is transmitted to EN computing device 102 prior to and after impact zone 300 is defined. In at least some embodiments, EN application 116 (shown in FIG. 1) is configured to cause user device 106 to collect and transmit location data 306 to EN computing device 102. For example, to preserve battery life of user device 106, location data 306 may be retrieved when applications or services installed on user device 106 other than EN application 116 request location data 306. In another example, EN application 116 periodically polls user device 106 for location data 306. In a further example, EN computing device 102 broadcasts a notification associated with emergency situation to user device 106. EN application 116 is transitioned from an inactive state to an active state in response to the notification to enable EN application 116 to collect location data 306.

In some embodiments, user device 106 is configured to transmit location data 306 to EN computing device 102 when bystander 107 (shown in FIGS. 1 and 2) has moved beyond a predetermined distance threshold. That is, user device 106 collects location data 306 but does not transmit location data 306 to EN computing device 102 until bystander 107 has moved a substantive distance (e.g., 1 kilometer). User device 106 is configured to store the last location sent to EN computing device 102 and compare a new location to the last location. If the distance between the two locations is within the distance threshold, user device 106 does not transmit location data 306 with the new location. However, if the distance is greater than the distance threshold, user device 106 transmits location data 306 with the new location. Selectively transmitting location data 306 facilitates at least one of: (i) limiting the effect of errors in location data 306 on the emergency notification process, (ii) reducing the bandwidth burden of EN computing device 102 processing location data 306, and (iii) reducing the battery drain on user device 106 caused by EN application 116.

Location data 306 is stored in database 103 to monitor movements of bystanders near and within impact zone 300. In some embodiments, location data 306 is stored within user profiles 216. In other embodiments, location data 306 is stored in database 103 with an identifier associated with bystander 107. Location data 306 is stored with a timestamp to determine how recent location data 306 was received. When new location data 306 is received, EN computing device 102 determines whether or not previously stored location data 306 should be removed. In some embodiments, EN computing device 102 is configured to provide a graphical interface to administrator 105 displaying the locations of each user device 106 (and bystander) within region 200 and impact zone 300.

EN computing device 102 is configured to detect user devices 106 located within impact zone 300 based on location data 306 and automatically transmit an emergency notification 308 to the detected user devices 106. Emergency notification 308 is a text message, email, phone call, notification (e.g., via EN application 116) and/or any other suitable notification that indicates to the bystander that emergency situation 202 is nearby. In some embodiments, notification 308 indicates the type of emergency, a description of the emergency, an estimated location of the emergency, a distance between user device 106 and the estimated location of the emergency, a reported time of emergency, and/or a status of the emergency or the emergency response. Based on notification 308, the bystanders may determine a course of action, such as evacuate impact zone 300.

In some embodiments, for user devices 106 that remain in impact zone 300, EN computing device 102 is configured to periodically send emergency notifications 308 to user devices 106. In other embodiments, EN computing device 102 transmits a single emergency notification 308 for each time user device 106 enters impact zone 300. That is, if user device 106 enters impact zone 300, exits zone 300, and then subsequently enters zone 300 again, EN computing device 102 sends two emergency notifications to user device 106 for entering zone 300.

In the exemplary embodiment, impact zone 300 remains active (i.e., notifications 308 associated with zone 300 are automatically transmitted to user devices) for a predetermined period of time or until administrator 105 deactivates zone 300. When zone 300 is deactivated, no notifications 308 associated with zone 300 are transmitted. A deactivated impact zone represents a resolved emergency situation 202 or a non-emergency. In at least some embodiments, deactivated impact zones are stored as zone data 304 for subsequent use. For example, if a particular emergency situation 202 is likely to occur again at zone 300, zone 300 is stored in a deactivated state until administrator 105 determines situation 202 has occurred again, and zone 300 is reactivated.

In the exemplary embodiment, EN computing device 102 is configured to define a warning zone 310 around the boundaries of impact zone 300 to facilitate proactive alerts to bystanders. Warning zone 310 is defined based upon impact zone 300. That is, warning zone 310 extends a predefined distance from the boundaries of impact zone 300 and/or the location of emergency situation 202. In one example in which situation 202 is a biological or chemical emergency, warning zone 310 is a circular zone centered on situation 202 and having a predefined radius (e.g., 10 kilometers) in accordance with one or more emergency standards, such as standards established by The World Organization for Animal Health in Paris and the U.S. Department of Agriculture. Additionally or alternatively, warning zone 310 is defined by EN computing device 102 and administrator 105 similar to impact zone 300. In an example, warning zone 310 is a circular zone having a radius and/or a center location defined by administrator 105. In at least some embodiments, administrator 105 provides a user selection of at least one of a center location, a shape, and a radius size (or other dimensions based on the selected shape) for warning zone 310. In such embodiments, EN computing device 102 defines warning zone 310 based on the user selection.

EN computing device 102 is configured to detect user devices 106 located within warning zone 310 and automatically transmit emergency notification 308 to the detected user devices 106. In some embodiments, notification 308 is the same for both user devices 106 within impact zone 300 and warning zone 310. In other embodiments, notification 308 is different for user devices 106 within impact zone 300 and devices 106 within warning zone 310.

Figure 4:
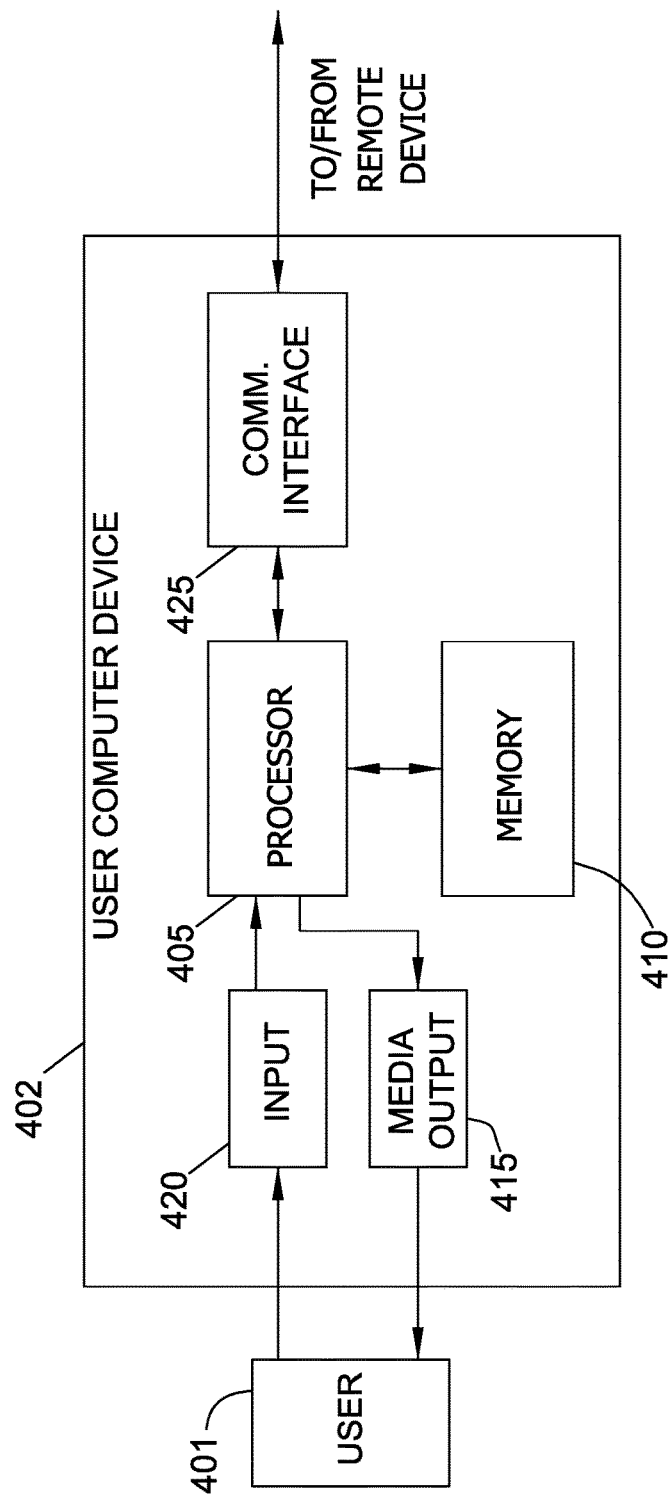
FIG. 4 is an expanded block diagram of an example embodiment of a user device for use in the system shown in FIG. 1.

FIG. 4 depicts an exemplary configuration of a remote or user computing device 402, such as administrator device 104 and user devices 106 (both shown in FIG. 1). Computing device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or other data to be stored and retrieved. Memory area 410 may include one or more computer-readable media.

Computing device 402 may also include at least one media output component 415 for presenting information to a user 401. Media output component 415 may be any component capable of conveying information to user 401. In some embodiments, media output component 415 may include an output adapter, such as a video adapter and/or an audio adapter. An output adapter may be operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 415 may be configured to present an interactive user interface (e.g., a web browser or client application) to user 401.

In some embodiments, computing device 402 may include an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Computing device 402 may also include a communication interface 425, which may be communicatively coupleable to a remote device. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 420. A user interface may include, among other possibilities, a web browser and client application. Web browsers enable users 401 to display and interact with media and other information typically embedded on a web page or a website, such as a web page associated with EN computing device 102 (shown in FIG. 1). A client application (e.g., EN application 116, shown in FIG. 1) allows users 401 to interact with a server application associated with, for example, EN computing device 102.

Figure 5:
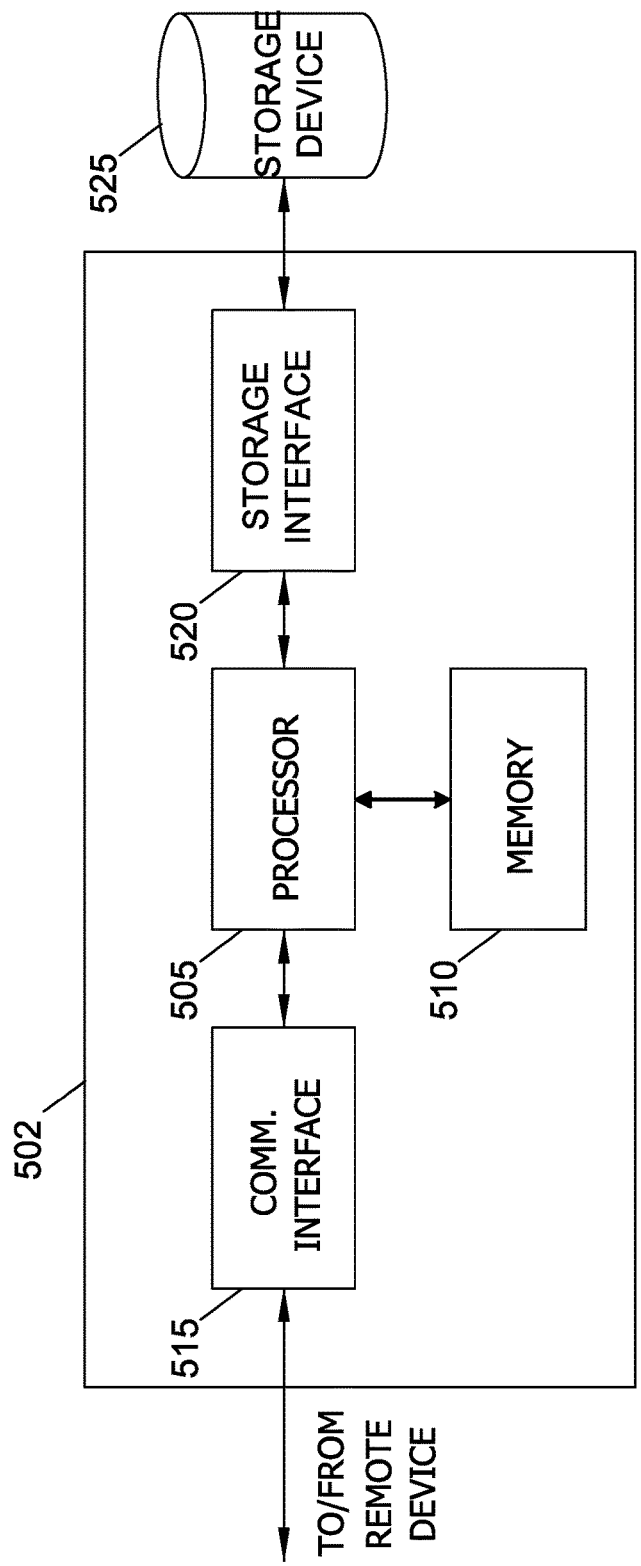
FIG. 5 illustrates an example configuration of a host system for use in the system shown in FIG. 1.

FIG. 5 depicts an exemplary configuration of a host computing device 502, such as EN computing device 102 and administrator device 104 (both shown in FIG. 1). Host computing device 502 may include a processor 505 for executing instructions. Instructions may be stored in a memory area 510, for example. Processor 505 may include one or more processing units (e.g., in a multi-core configuration).

Processor 505 may be operatively coupled to a communication interface 515 such that host computing device 502 may be capable of communicating with a remote device such as computing device 402 shown in FIG. 4 or another host computing device 502. For example, communication interface 515 may receive location data, emergency reports, and other user input from user computing device 402 via a respective interface 112, 114 (both shown in FIG. 1).

Processor 505 may also be operatively coupled to a storage device 525 (e.g., database 103, shown in FIG. 1). Storage device 525 may be any computer-operated hardware suitable for storing and/or retrieving data. In some embodiments, storage device 525 may be integrated in host computing device 502. For example, host computing device 502 may include one or more hard disk drives as storage device 525. In other embodiments, storage device 525 may be external to host computing device 502 and may be accessed by a plurality of host computing devices 502. For example, storage device 525 may include multiple storage units such as hard disks or solid state disks in a redundant array of inexpensive disks (RAID) configuration. Storage device 525 may include a storage area network (SAN) and/or a network attached storage (NAS) system.

In some embodiments, processor 505 may be operatively coupled to storage device 525 via a storage interface 520. Storage interface 520 may be any component capable of providing processor 505 with access to storage device 525. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 525.

Memory areas 410 (shown in FIG. 4) and 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
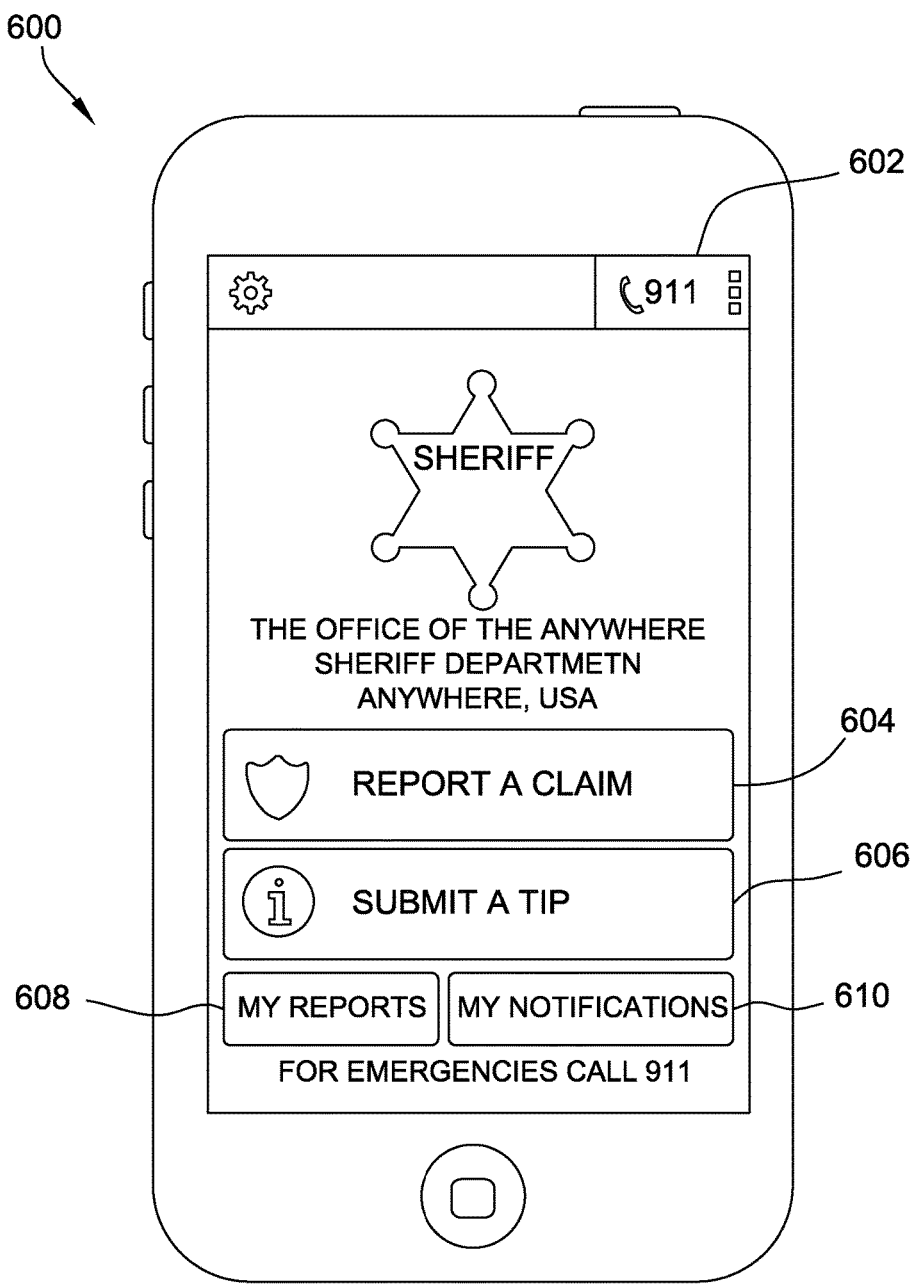
FIG. 6 is an exemplary screenshot of a home interface for a user device of the system shown in FIG. 1.

FIG. 6 is an exemplary screenshot 600 of a home interface of EN application 116 on user device 106 for reporting emergencies in system 100 (each shown in FIG. 1). In the exemplary embodiment, to report an emergency, a bystander activates EN application 116 installed on his or her user device 106 to arrive at the home interface. The home interface includes several selectable options to provide various features of EN application 116. In the exemplary embodiment, the home interface includes an emergency call option 602, an emergency report option 604, a tip option 606, a user reports option 608, and a user notification option 610. In other embodiments, the home interface has a different layout and/or different selectable options.

Emergency call option 602, when selected by the bystander, causes user device 106 to initiate a phone call to an emergency response provider. Selecting emergency report option 604 causes EN application 116 to prompt the bystander for information regarding an emergency situation and to generate an emergency report as described herein. Tip option 606 enables bystanders to submit information that may be relevant to ongoing or future emergency situations. The information is transmitted to EN computing device 102 for storage and review by administrator 105 (both shown in FIG. 1). User reports option 608 enables the bystander to review historical reports submitted by the bystander. In some embodiments, a user profile 216 (shown in FIG. 2) for the bystander including the historical reports is retrieved from EN computing device 102. In certain embodiments, a status of each emergency report (e.g., ongoing, resolved, etc.) may be provided to the bystander with the historical emergency reports. User notification option 610 enables the bystander to review the emergency notifications received at user device 106 for at least a predetermined period of time. In some embodiments, the emergency notifications associated with resolved emergencies or non-emergencies are removed such that user notification option 610 provides only the alerts associated with activate or on-going emergency situations.

Figure 7:
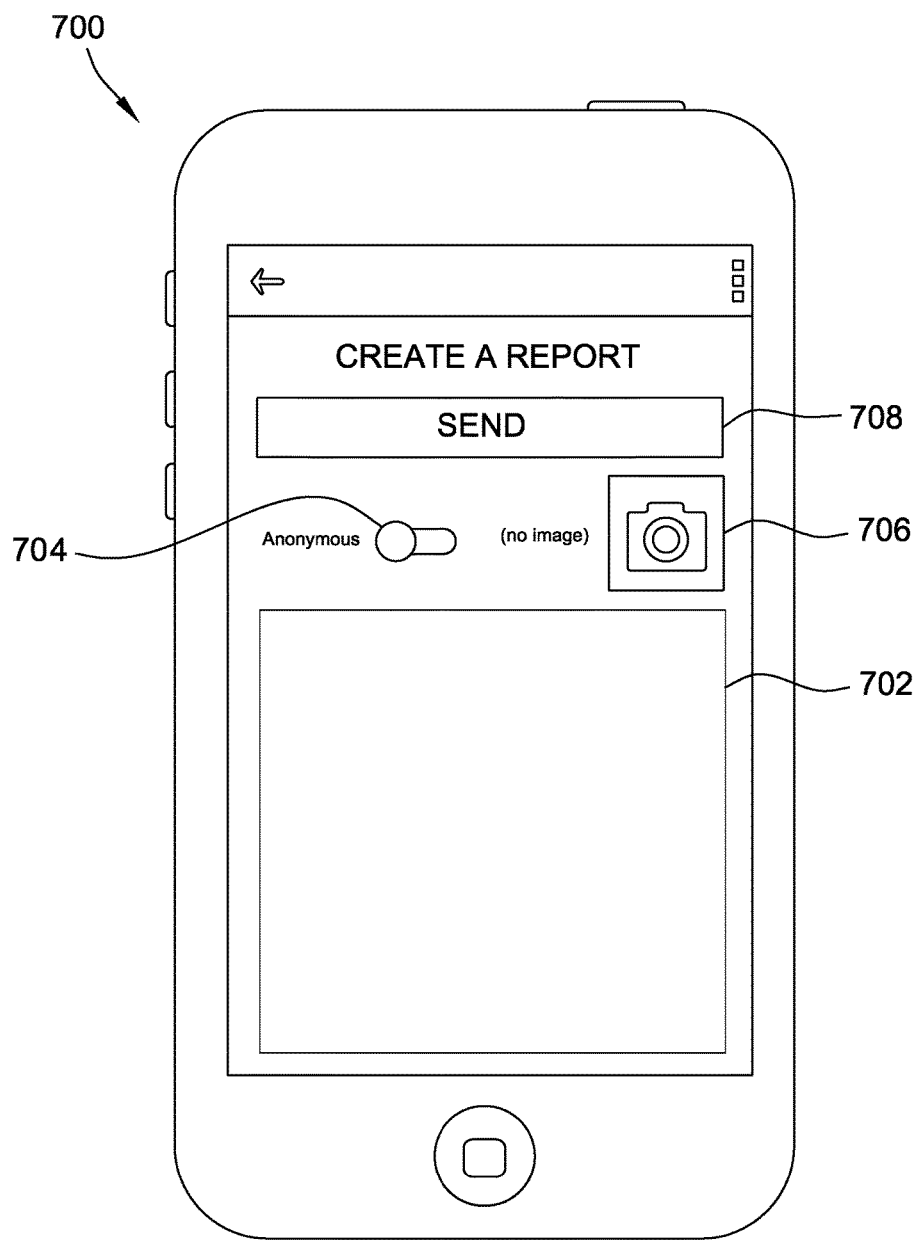
FIG. 7 is an exemplary screenshot of a report interface for a user device of the system shown in FIG. 1.

FIG. 7 is an exemplary screenshot 700 of a report interface of EN application 116 on user device 106 for reporting emergencies in system 100 (each shown in FIG. 1). In the exemplary embodiment, when a bystander selects emergency report option 604 (shown in FIG. 6) from the home interface, EN application 116 displays the report interface to the bystander to prompt the bystander to provide information associated with the emergency situation for the report. The report interface includes a description box 702, an identity option 704, an image option 706, and a submittal option 708. In other embodiments, the report interface has a different layout and/or different components.

In the exemplary embodiment, the bystander provides user input to user device that describes the emergency situation. The user input is text data that is entered into description box 702. Identity option 704 enables the bystander to selectively anonymize his or her identity when submitting the emergency report. That is, the bystander can choose whether or not to make his or her identity available with the report. In certain embodiments, when the bystander chooses to make his or her identity available, a user profile 216 (shown in FIG. 2) associated with the bystander is retrieved by EN computing device 102 (shown in FIG. 1) when the report is received. The report is then linked to user profile 216 of the bystander. Conversely, if the report is submitted with an anonymous identity, EN computing device 102 does not retrieve user profile 216 or link the report to profile 216.

Image option 706 enables the bystander to capture image data or video data associated with the emergency situation. The image and video data is captured by user device 106, for example, using a camera (not shown) of user device 106. Submittal option 708, when selected, causes EN application 116 to generate an emergency report and transmit the report to EN computing device 102. In at least some embodiments, submittal option 708 is not selectable until the bystander has entered a required amount of information regarding the emergency situation to prevent EN computing device 102 receiving incomplete emergency reports. In such embodiments, submittal option 708 may be configured to visually change to indicate the emergency report is complete and can be submitted. In one example, the emergency report requires a description within description box 702 to be generated. When submittal option 708 is selected, EN application 116 is configured to extract the data provided by the bystander to generate the emergency report. In addition, EN application 116 retrieves location data and/or other stored information from user device 106 to complete the report. The data is formatted in a readable format for EN computing device 102 to facilitate identification and extraction of the data from the emergency report.

Figure 8:
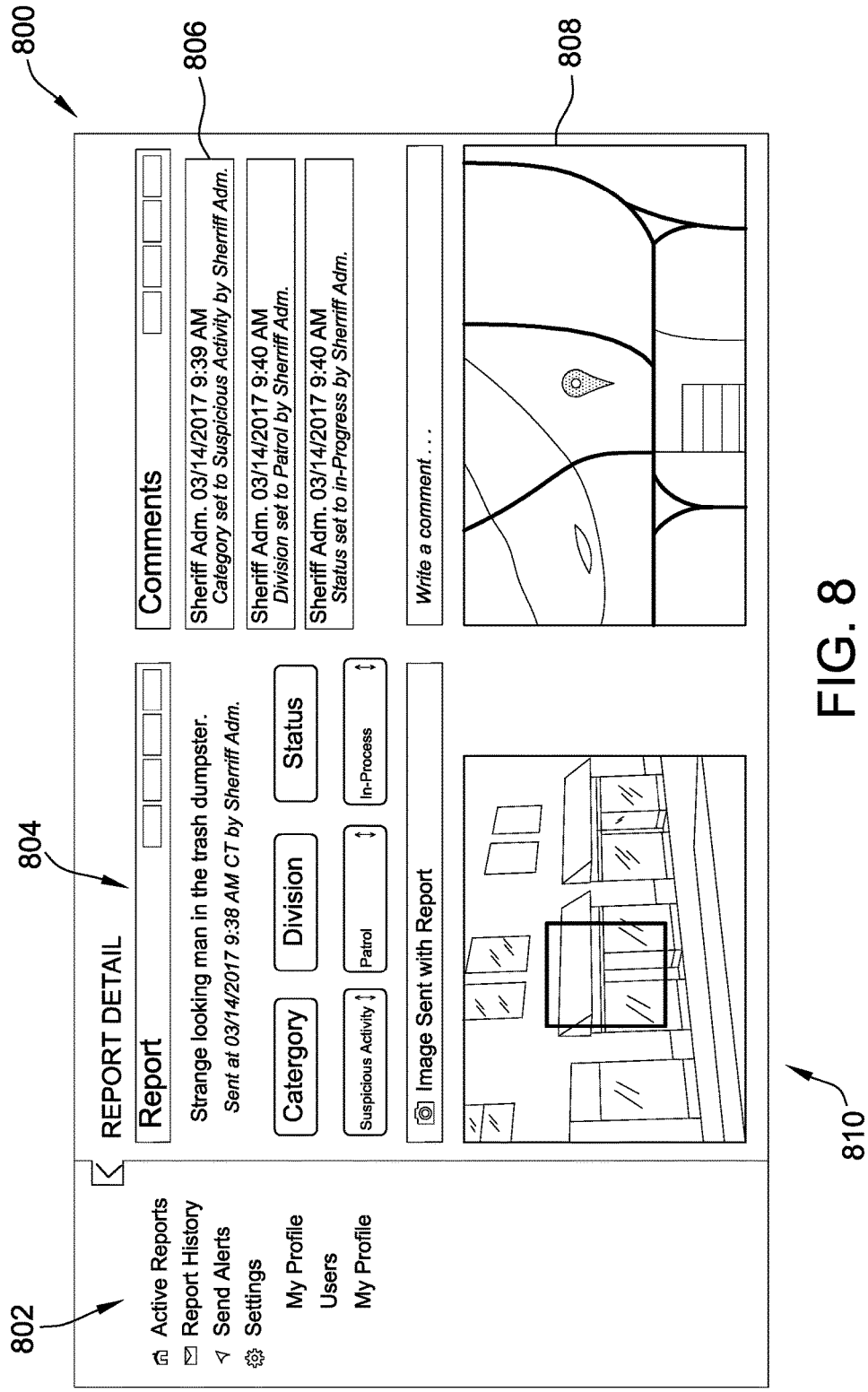
FIG. 8 is an exemplary screenshot of an administrator interface provided by the system shown in FIG. 1.

FIG. 8 is an exemplary screenshot 800 of administrator interface 112 provided by EN computing device 102 for administrator 105 in system 100 (each shown in FIG. 1). In particular, screenshot 800 is an interface for monitoring a received emergency report and includes a toolbar 802, a report detail section 804, a comment section 806, a map section 808, and an image section 810. In other embodiments, the interface for monitoring emergency report has a different layout and/or includes different sections.

Toolbar 802 provides administrator 105 with a set of selectable options for managing administrator interface 112 and EN computing device 102, such as, and without limitation, displaying active emergency reports, reviewing historical reports, sending emergency notifications by defining impact zones, and/or customizing settings associated with administrator interface 112.

Report detail section 804 provides information regarding a selected emergency report. Section 804 includes information extracted from the emergency report, such as the description of the emergency, the image or video data sent with the report, and the identity of the bystander that sent the report. In at least some embodiments, report detail section 804 further includes an emergency category identifier, an emergency responder identifier, and a status identifier. The emergency category identifier indicates a type of emergency, the emergency responder identifier indicates one or more emergency responders assigned to investigate the emergency report, and the status identifier indicates the status of the emergency (e.g., ongoing or resolved). The identifiers are set by administrator 105. In some embodiments, EN computing device 102 may automatically set one or more identifiers.

Comment section 806 is configured to receive comments from administrator 105 to provide additional information regarding the monitored emergency report. In at least some embodiments, comment section 806 includes a log of any changes or actions performed by administrator 105 and EN computing device 102. For example, if administrator 105 changes the status identifier in detail section 804, comment section 806 is automatically updated to reflect the changed status identifier. The comments within comment section 806 are stored by EN computing device 102 to facilitate subsequent retrieval with the emergency report.

Map section 808 provides a geographical map identifying an estimated location of the emergency situation. In some embodiments, map section 808 identifies the location of the reporting bystander at the time of the report. In certain embodiments, map section 808 may also display the location of nearby bystanders.

Image section 810 provides an image and/or video of the emergency situation. In the exemplary embodiment, image section 810 includes the image data from the emergency report. In some embodiments, image section 810 may include more than one image of the emergency situation. For example, if multiple reports are received from the same emergency situation, the images may be viewed collectively in image section 810.

Figure 9:
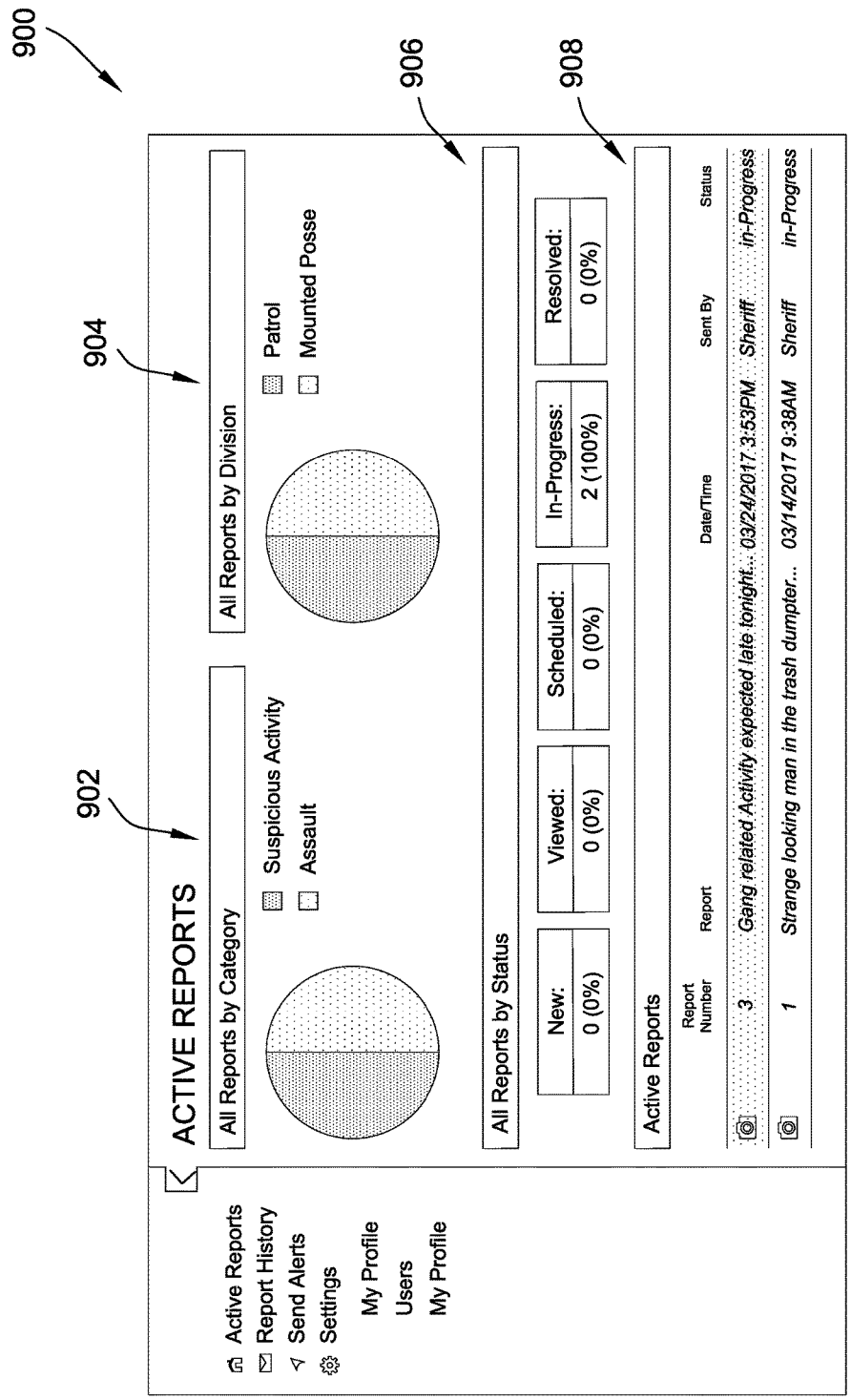
FIG. 9 is an exemplary screenshot of an active report interface provided by the system shown in FIG. 1.

FIG. 9 is an exemplary screenshot 900 of an active report interface within administrator interface 112. In particular, the active report interface provides administrator 105 with aggregated information regarding all active emergency reports (i.e., reports that have not been resolved or identified as non-emergencies).

In the exemplary embodiment, the active report interface displays aggregated data in several sections. In particular, the active report interface includes a category section 902, a division section 904, and a status section 906. Category section 902 indicates the different category identifiers of the active reports. Division section 904 indicates the different emergency responders assigned to the active reports (i.e., the emergency responder indicators). In the exemplary embodiment, category section 902 and division section 904 include a pie chart illustrating the percentage of the total active reports having a particular category identifier. Status section 906 indicates a percentage of the total number of active reports having each status identifier. In other embodiments, sections 902, 904, 906 display the aggregated data in another suitable format.

The active report interface further includes a list section 908 that lists each active report. Selecting a report within list section 908 causes the administrator interface to transition to the report interface (FIG. 8) for the selected emergency report.

Figure 10:
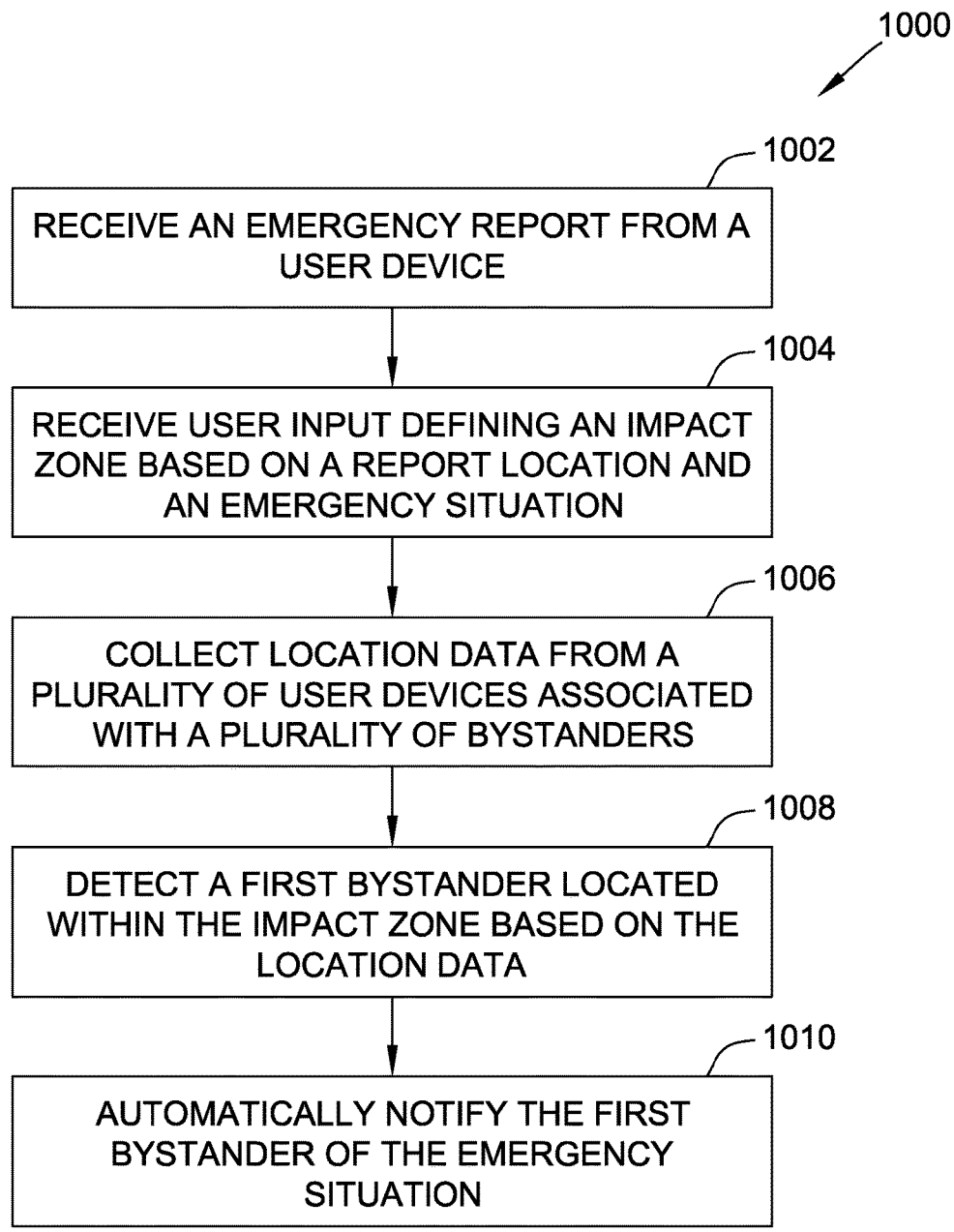
FIG. 10 is a flow diagram of an exemplary method for notifying bystanders of emergency situations for use with the system shown in FIG. 1.

FIG. 10 is a flow diagram of an exemplary method 1000 for notifying bystanders of emergency situations for use with system 100 (shown in FIG. 1). Method 1000 is at least partially performed by EN computing device 102 (shown in FIG. 1). In other embodiments, method 1000 includes additional, fewer, or alternative steps, including steps described elsewhere herein.

With respect to FIGS. 1 and 10, EN computing device 102 receives 1002 an emergency report identifying an emergency situation from user device 106. In at least some embodiments, the emergency report includes a report location, a description of the emergency situation, and/or image or video data of the emergency. The report location is either the estimated location of the emergency situation or the location of user device 106. In some embodiments, location data is collected separately from the emergency report such the EN computing device 102 is configured to associated a last known location of user device 106 with the emergency report. EN computing device 102 extracts the data from the emergency report and provides the data to administrator 105 for review. Administrator 105 reviews the data to determine a course of action for the emergency situation, such as dispatching emergency responders to address the situation.

If administrator 105 determines the bystanders should be notified of the emergency situation, administrator 105 provides user input to EN computing device 102. EN computing device 102 receives 1004 the user input to define an impact zone associated with the emergency situation. The impact zone is defined based on the emergency situation and the report location. In at least some embodiments, the user input includes geographical coordinate points and EN computing device 102 is configured to generate the boundary of the impact zone based on the coordinate points. In some embodiments, impact zone is predefined and stored by EN computing device. In such embodiments, the user input identifies a predefined impact zone to be activated.

EN computing device 102 collects 1006 location data from a plurality of user devices associated with a plurality of bystanders. The location data is collected irrespective of defining impact zone. That is, location data is continually collected prior to and after the impact zone is defined. The location data identifies the locations of the bystanders within a geographical region. EN computing device 102 detects 1008 a first bystander (e.g., bystander 107) is located within the impact zone based on the location data and automatically notifies 1010 the first bystander of the emergency situation. The bystander may evacuate the impact zone in response to the notification or making other decisions based on the emergency situation. For example, if the bystander is an emergency responder, the emergency responder may approach the emergency situation to provide assistance in resolving the situation. The impact zone remains active for a predetermined period of time (e.g., one hour) and/or until administrator 105 updates the status of the impact zone or the emergency situation.

As will be appreciated based on the foregoing specification, the above-described embodiments of the disclosure may be implemented using computer programming or engineering techniques including computer software, firmware, hardware or any combination or subset thereof, wherein the technical effect is to establish and operate a filesystem-based application network. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An emergency notification (EN) computing device comprising at least one processor and a memory in communication with said at least one processor, wherein said at least one processor is programmed to:
   define a plurality of impact zones within a geographical region prior to receiving an emergency report, wherein each of the plurality of impact zones is identified as inactive;
   receive, from a user device, the emergency report identifying an emergency situation, wherein the emergency report is associated with a report location;
   receive user input selecting at least one of the plurality of impact zones within the geographical region based on the report location and the emergency situation;
   activate the at least one selected impact zone;
   collect location data from a plurality of mobile user devices carried or worn by a plurality of bystanders;
   detect a first bystander of the plurality of bystanders located within the impact zone based on the location data; and
   automatically trigger the mobile user device of the first bystander to notify the first bystander of the emergency situation.

2. The EN computing device in accordance with claim 1, wherein the location data identifies a first location of the first bystander, and said at least one processor is further programmed to:
   collect additional location data for the first bystander that identifies a second location of the first bystander from a first user device of the plurality of mobile user devices after the location data is collected, wherein the first user device transmits the additional location data when a distance between the first location and the second location exceeds a predetermined distance threshold; and
   determine whether the first bystander is within the impact zone based upon the second location.

3. The EN computing device in accordance with claim 1 further comprising an interface communicatively coupled to said at least one processor, said interface configured to display the emergency situation and locations of the plurality of bystanders, wherein said at least one processor is further programmed to update said interface in response to updates to at least one of the report location and the location data.

4. The EN computing device in accordance with claim 3, wherein said interface is configured to:
   display the geographical region;
   receive the user input defining the impact zone; and
   display the impact zone within the geographical region.

5. The EN computing device in accordance with claim 1, wherein the user input includes at least three geographical coordinate points, wherein said at least one processor is further programmed to define the impact zone based on the at least three geographical coordinate points.

6. The EN computing device in accordance with claim 1, wherein the report location is a last known location of the user device based on previously collected location data.

7. The EN computing device in accordance with claim 1, wherein said at least one processor is further programmed to:
   define a warning zone around a boundary of the impact zone;
   detect that a second bystander of the plurality of bystanders is located within the warning zone based on the location data; and
   notify the second bystander of the emergency situation in response to the detection.

8. The EN computing device in accordance with claim 7, wherein said at least one processor is further programmed to:
receive a user selection of at least one of a center location and a radius size for the warning zone; and
define the warning zone based on the user selection.

9. The EN computing device in accordance with claim 1, wherein said at least one processor is further programmed to remove the impact zone after a predetermined period of time.

10. A method for notifying bystanders of an emergency situation, said method comprising:
defining a plurality of impact zones within a geographical region prior to receiving an emergency report, wherein each of plurality of impact zones is identified as inactive;
receiving, by an emergency notification (EN) computing device, the emergency report from a user device, wherein the emergency report identifies an emergency situation and is associated with a report location;
receiving user input selecting or defining at least one of the impact zones within the geographical region based on the report location and the emergency situation;
activating the at least one selected impact zone; and
collecting, by the EN computing device, location data from a plurality of mobile user devices carried or worn by the plurality of bystanders;
detecting a first bystander of the plurality of bystanders located within the impact zone based on the location data; and
automatically notifying, by triggering the mobile user device of the first bystander, the first bystander of the emergency situation.

11. The method in accordance with claim 10, wherein the location data identifies a first location of the first bystander, and said method further comprises:
collecting additional location data for the first bystander that identifies a second location of the first bystander from a first user device of the plurality of mobile user devices after the location data is collected, wherein the first user device transmits the additional location data when a distance between the first location and the second location exceeds a predetermined distance threshold; and
determining, by the EN computing device, whether the first bystander is within the impact zone based upon the second location.

12. The method in accordance with claim 10, wherein receiving the user input further comprises:
receiving at least three geographical coordinate points; and
defining, by the EN computing device, the impact zone based on the at least three geographical coordinate points.

13. The method in accordance with claim 12, wherein defining the impact zone further comprises establishing boundaries of the impact zone between each coordinate point of the at least three geographical coordinate points.

14. The method in accordance with claim 10 further comprising:
defining, by the EN computing device, a warning zone around a boundary of the impact zone;
detecting that a second bystander of the plurality of bystanders is located within the warning zone based on the location data; and
notifying the second bystander of the emergency situation in response to the detection.

15. The method in accordance with claim 14, wherein defining the warning zone further comprises:
receiving a user selection of at least one of a center location and a radius size for the warning zone; and
defining the warning zone based on the user selection.

16. The method in accordance with claim 10 further comprising removing the impact zone after a predetermined period of time.

17. At least one non-transitory computer-readable storage media having computer-executable instructions embodied thereon, wherein when executed by at least one processor, the computer-executable instructions cause the at least one processor to:
define a plurality of impact zones within a geographical region prior to receiving an emergency report, wherein each of the plurality of impact zones is identified as inactive;
receive, from a user device, the emergency report identifying an emergency situation, wherein the emergency report is associated with a report location;
receive user input selecting or defining at least one of the impact zones within the geographical region based on the report location and the emergency situation;
activate the at least one selected impact zone;
collect location data from a plurality of mobile user devices carried or worn by a plurality of bystanders;
detect a first bystander of the plurality of bystanders located within the impact zone based on the location data; and
automatically trigger the mobile user device of the first bystander to notify the first bystander of the emergency situation.

18. The computer-readable storage media in accordance with claim 17, wherein the user input includes at least three geographical coordinate points, wherein the computer-executable instructions further cause the at least one processor to define the impact zone based on the at least three geographical coordinate points.

19. The computer-readable storage media in accordance with claim 17, wherein the computer-executable instructions further cause the at least one processor to:
define a warning zone around a boundary of the impact zone;
detect that a second bystander of the plurality of bystanders is located within the warning zone based on the location data; and
notify the second bystander of the emergency situation in response to the detection.

20. An emergency notification (EN) computing device comprising at least one processor in communication with at least on memory device, wherein the at least one processor is programmed to:
define a plurality of impact zones within a geographical region prior to receiving an emergency report, wherein each of the plurality of impact zones is identified as inactive;
receive, from a user device, the emergency report identifying an emergency situation, wherein the emergency report is associated with a report location within the geographic region;
receive user input selecting at least one impact zone of the plurality of impact zones based on the report location and the emergency situation;
activate the at least one impact zone;
collect location data from a plurality of mobile user devices;

determine at least one mobile user device of the plurality of mobile user devices located in the at least one impact zone based on the location data; and transmit a notification to the at least one mobile user device, wherein the notification includes instructions to a user associated with the at least one mobile user device based on the emergency report.

21. The EN computing device in accordance with claim 20, wherein the at least one processor is further programmed:

determine that an additional mobile user device of the plurality of mobile user devices is not located in the at least one impact zone;

collect additional location data from the additional mobile user device;

determine that the additional mobile user device is currently located in the at least one impact zone; and transmit the notification to the additional mobile user device.

* * * * *